US005453059A

United States Patent [19]
Avramidis et al.

[11] Patent Number: 5,453,059
[45] Date of Patent: Sep. 26, 1995

[54] VARIABLE PITCH SILENT CHAIN

[75] Inventors: Stellios A. Avramidis, Howell, Mich.; Timothy J. Ledvina, Groton, N.Y.

[73] Assignee: Borg-Warner Automotive, Inc., Sterling Heights, Mich.

[21] Appl. No.: 285,398

[22] Filed: Aug. 3, 1994

Related U.S. Application Data

[63] Continuation-in-part of Ser. No. 131,473, Oct. 4, 1993, which is a continuation-in-part of Ser. No. 885,194, May 19, 1992, abandoned.

[51] Int. Cl.$^6$ .................................................. F16G 13/04
[52] U.S. Cl. ............................................................ 474/212
[58] Field of Search .................................... 474/212–217

[56] References Cited

U.S. PATENT DOCUMENTS

| | | | |
|---|---|---|---|
| 1,868,334 | 7/1932 | Morse | 474/216 |
| 3,377,875 | 4/1968 | Sand | 474/94 |
| 3,495,468 | 2/1970 | Griffel | 474/157 |
| 3,597,985 | 8/1971 | Jeffrey | 474/157 X |
| 4,168,634 | 9/1979 | Griffel | 474/157 X |
| 4,342,560 | 8/1982 | Ledvina et al. | 474/213 X |
| 4,344,761 | 8/1982 | Steuer | 474/245 |
| 4,650,445 | 3/1987 | Mott | 474/201 |
| 4,758,210 | 7/1988 | Ledvina | 474/212 |
| 4,832,668 | 5/1989 | Ledvina et al. | 474/157 X |
| 4,915,675 | 4/1990 | Avramidis | 474/214 X |
| 4,915,676 | 4/1990 | Komeya | 474/213 |
| 4,943,266 | 7/1990 | Mott | 474/201 |
| 5,154,674 | 10/1992 | Avramidis et al. | 474/214 |
| 5,192,252 | 3/1993 | Skurka et al. | 474/210 |
| 5,192,253 | 3/1993 | Cole et al. | 474/214 |
| 5,397,280 | 3/1995 | Skurka | 474/206 |

*Primary Examiner*—Roger J. Schoeppel
*Attorney, Agent, or Firm*—Willian Brinks Hofer; Greg Dziegielewski

[57] ABSTRACT

A silent or inverted tooth chain assembly includes links of different or unequal pitch lengths. Some sets of links have links of a first pitch length, while other sets of links have links of a second, or different pitch length. The pitch length of the links may be altered by varying the distance between the centers of the apertures of two links or the location of the apertures within the link. The links with differing pitch length may be randomly arranged in a prescribed pattern through the length of the chain. In addition to variation of pitch length, further randomization is achieved by including links of two different configurations.

19 Claims, 3 Drawing Sheets

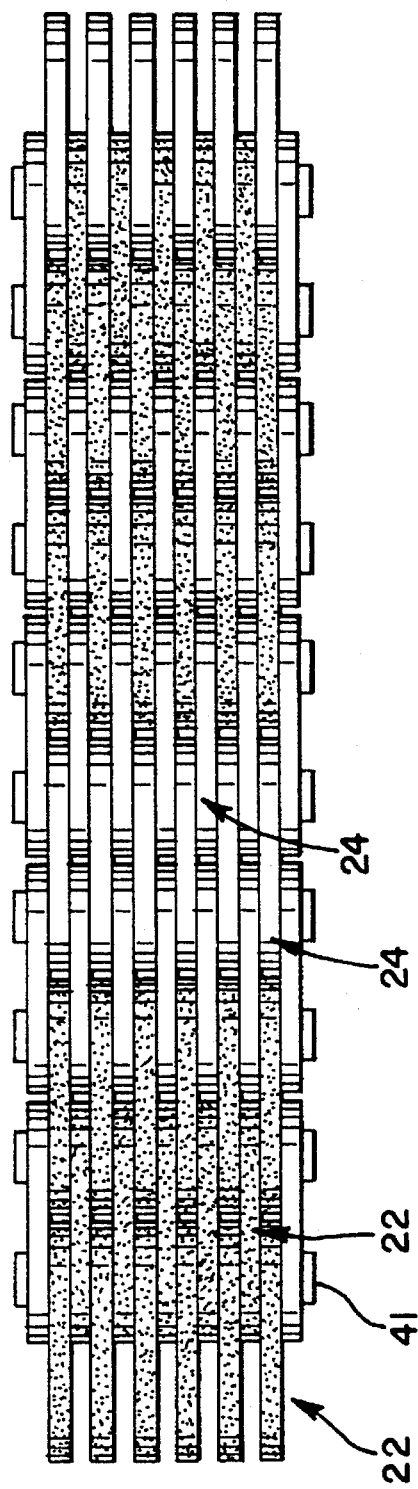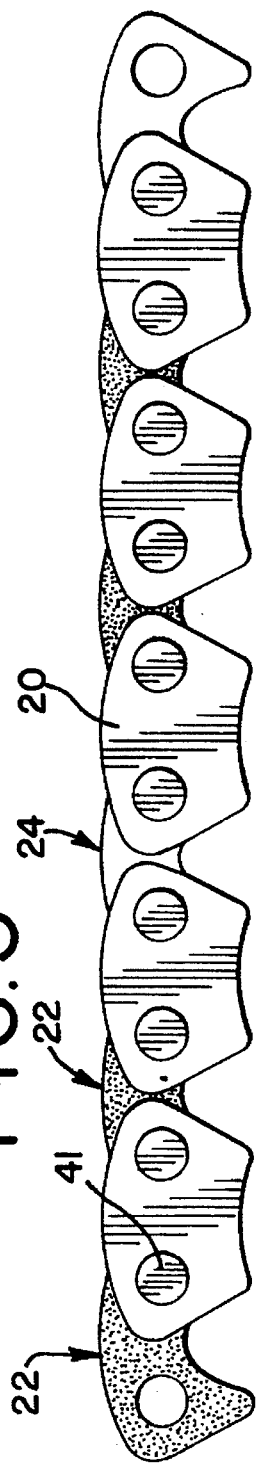

VARIABLE PITCH SILENT CHAIN

This application is a continuation-in-part of application Ser. No. 08/131,473 filed Oct. 4, 1993, pending which is a continuation-in-part of application Ser. No. 07/885,194 filed May 19, 1992, abandoned.

BACKGROUND OF THE INVENTION

The present invention relates generally to power transmission chains. The invention has particular application to power transmission chains of the inverted tooth or silent chain variety, which are used in engine timing applications as well as in the transfer of power from an engine to a transmission or in a transfer case of a four-wheel-drive vehicle.

Power transmission chains are widely used in the automotive industry. Such chains are used for engine timing drives as well as for the transfer of power from the engine to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. The links are connected by pivot means, which are typically round pins received in a pair of apertures. Examples of silent chain is found in U.S. Pat. No. 4,342,560 and U.S. Pat. No. 4,832,668, which are both incorporated herein by reference.

Conventional silent chains typically include both guide links and driving links. The guide links are positioned on the outside edges of alternate sets of links. The guide links typically act to position the silent chain laterally on the sprocket. Guide links in silent chains typically do not mesh with the sprocket.

The inverted tooth links, or sprocket engaging links, provide the transfer of power between the chain and the sprocket. Each inverted tooth link typically includes a pair of apertures and a pair of depending toes or teeth. Each toe is defined by an inside flank and an outside flank. The inside flanks are joined at a crotch. The inverted tooth links are typically designed so that at least some of the links contact the sprocket teeth to transfer power between the chain assembly and the sprocket. The inverted tooth links, or driving links, contact the sprocket teeth along their inside link flanks or their outside link flanks or combinations of both flanks. The contacts between the flanks and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Movement of a driving sprocket causes power transmission through the chain and consequent movement of a driven sprocket. In an engine timing drive application, the driving sprocket may be mounted on the engine crankshaft and the driven sprocket mounted on a valve camshaft. A silent chain for an engine timing drive application is shown in U.S. Pat. No. 4,758,210, which is incorporated herein by reference. Various types of engine timing systems and configurations are also shown in U.S. application Ser. No. 08/131,473, filed Oct. 4, 1993, pending which is incorporated herein by reference.

Noise is associated with such chain drives. Noise is generated by a variety of sources, but in silent chain drives it can be caused, in part, by the impact sound generated by the collision of the chain and the sprocket at the onset of meshing. The loudness of the impact sound is affected by, among other things, the impact velocity between the chain and the sprocket.

The meshing impact sound is generally a periodic sound in chain drives. The impact sound is repeated with a frequency approximately equal to that of the frequency of the chain meshing with the sprocket. The frequency can be related to the number of teeth on the sprocket and the speed of the sprocket. The impacts can produce sound having objectionable pure sonic tones.

Another cause of noise is the chordal action of the sprockets as the chain is driven about the sprockets. Chordal action occurs as the chain link enters the sprocket from the free chain. The meshing of the chain and sprocket at the chain mesh frequency can cause a movement of the free chain or span (the part of the chain between the sprockets) in a direction perpendicular to the chain travel but in the same plane as the chain and sprockets. This vibratory movement can also produce a pure sonic tone at the frequency of the chain mesh frequency or a derivative of it.

Many efforts have been made to decrease the noise level and pitch frequency distribution in chain drives of the silent chain variety to minimize the objectionable effects of the pure sonic tones. The problem of noise reduction in silent chain drives was addressed in U.S. Pat. No. 4,342,560 by changing the contacts between the link flanks of a silent chain and the sprockets by having differently configured link flanks in different sets of the chain. By mixing links of differing flank configuration, U.S. Pat. No. 4,342,560 attempted to modify the pattern of sound emanating from the chain contacting the sprocket by altering the types of link configurations and thus altering the point and rhythm of contacts.

U.S. Pat. No. 4,915,675, which is incorporated herein by reference, utilized the same concept of modifying the pattern of sound emanating from the chain by altering the types of link configurations. The patent teaches the utilization of an asymmetrically shaped link form which is then oriented in two different directions in the chain assembly to alter the point and rhythm of chain to sprocket contacts.

Other attempts to alter the rhythm of contacts between the silent chain drive and the sprocket have focused on the modification of the sprocket teeth. For example, U.S. Pat. No. 3,377,875 and U.S. Pat. No. 3,495,468, teach relief of the sprocket teeth, or even elimination of sprocket teeth, in order to achieve noise reduction in contacts between the links of the silent chain and the sprocket teeth.

A belt for a cone pulley transmission is described in U.S. Pat. No. 4,344,761, which is designed to prevent sympathetic vibrations between the belt and the cone pulleys. The disclosed belt construction includes segmented steel belts with multiple segments that do not positively engage a sprocket. The patent teaches causing the lengths of selected links between associated articulation points to differ from those of the remaining links. The links of U.S. Pat. No. 4,344,761 are not designed to engage sprocket teeth and thus are not subject to any of the constraints of inverted tooth links. U.S. Pat. No. 4,650,445 discusses various other methods of construction of silent chains and chain-belts for variable pulley transmissions that are attempts to modify the generated noise pattern.

The present invention utilizes these generic concepts of noise reduction in an inverted tooth or silent chain. The present invention seeks to provide a silent chain construction that modifies the pattern of chain and sprocket contacts through the use of variable pitches or unequal pitch lengths in the chain. These unequal pitch lengths are achieved through the use of unequal pin separation distances as well as unequal aperture separation distances, which will result in variation of the pitches of the links of the chain. The pitch lengths are varied or randomized through the length of the chain to modify the chain link and sprocket contacts. The randomization of the pitch length may also be utilized in combination with randomization of the link flank contours or profiles. The randomization of pitch lengths with randomization of link flank contours provides an additional element of randomization or modification of the pattern of chain and sprocket contacts.

The present invention also has application in the design of a chain for a specific sprocket center distance. Unlike chains in which all links are formed of identical pitch, the chain of the present invention can insert links of different pitch lengths to accommodate a special sprocket-to-sprocket center distance. By controlling the number of pitches and links, and using two or more pitches in the chain, the chain may accommodate a variable center distance. Such a chain has application outside of the area of use of variable pitch for noise reduction.

Prior art chain assemblies have utilized pins of various configurations and placement in a variety of locations. However, those assemblies have provided placement of the pins in locations in the links in order to achieve uniform spacing for proper engagement with the sprockets. For example, U.S. Pat. No. 1,868,334 discloses a chain in which the centers of articulation are longer or shorter in different parts of the chain. The patent describes a chain in which all of the links are of identical configuration and orientation and the center of curvatures of the pins are eccentric or offset from the joint so that in some joints the centers are forward of the joint and in some joints the centers are backward of the joint. The patent does not teach variation of pitch lengths where the pins are identical or where the centers of articulation are not located on opposite sides of the links.

SUMMARY OF THE INVENTION

In accordance with one embodiment of this invention, a silent chain is provided with interleaved sets of links having a pair of depending toes. Each link includes a pair of apertures, with an aperture from one set of links being substantially aligned with an aperture from an adjacent set of links. Pivot members, in the form of round pins or rocker joints, are utilized to connect the adjacent sets of links through the apertures, and to allow pivoting of the sets of links with adjacent sets. Guide links are placed on alternating link sets to maintain the alignment of the chain on the sprockets.

The chain assembly includes links of different or unequal pitch lengths. That is, some sets of links will have links of a first pitch length, while other sets of links will have links of a second, or different pitch length. The pitch length of the links may be altered by varying the distance between the centers of the apertures of two links. The pitch length may be altered by varying the location of the apertures within the link. Other methods of construction are possible to obtain links with different pitch lengths.

The links with differing pitch length may be randomly arranged through the length of the chain. Alternatively, the links with differing pitch length may be arranged in a prescribed pattern through the length of the chain. In either embodiment, however, the links within a set are of the same pitch.

In addition to variation of pitch length, further randomization may be achieved by including two links of different configuration. The configurations may differ in link contour, link form, inside or outside flank configuration or profile, leading inside flank configuration, differing outside flank configurations, orientation (as with asymmetrical links that are oriented in different directions), type of driving contact with the sprocket teeth, or other types of randomization.

The chain assembly may include sets of links having different outside forms or profiles. Such differing sets of links may be placed in a random pattern or in a prescribed pattern throughout the chain. The links of differing pitch length may be of differing configuration or form. For example, link A may have form X and pitch length E; link B may have form Y and pitch length E; link C may have form X and pitch length F; and, link D may have form Y and pitch length F. Further combinations are possible that are within the scope of the invention. Link types A, B, C, and D are then randomized through the chain. In particular, sets are constructed entirely of one type of link with the pattern of sets randomized through the chain. Another type of chain could include only link types A and D, which would randomize both pitch length and contour with two link types or forms.

The chain of the present invention may also be used with a standard or a hybrid (random) sprocket. Similarly, the links may be used with a single pin rocker joint construction, such as shown in U.S. Pat. No. 5,192,253, which is incorporated herein by reference. The links may be used with a phased chain and sprocket assembly, such as shown in U.S. application Ser. No. 08/131,473, filed Oct. 4, 1993, pending which is incorporated herein by reference.

Use of a silent chain and sprocket constructed in accordance with the teachings of the present invention is expected to result in the generation of a noise pattern that is modified in comparison with the noise pattern generated by a chain and sprocket in which all the links are of identical pitch and configuration. The utilization of links with varying pitch lengths should vary the contacts between the chain links and the sprocket teeth. The utilization of links of varying pitch lengths should also allow construction of chains to fit particular sprocket-to-sprocket center distances.

BRIEF DESCRIPTION OF THE DRAWINGS

For a more complete understanding of the invention, one should refer to the embodiments illustrated in greater detail in the accompanying drawings and described below by way of examples of the invention. In drawings, which are not to scale:

FIG. 4 is a plan view of a segment of a chain constructed according to one embodiment of this invention, illustrating the links randomly arranged in a prescribed pattern;

FIG. 5 is a side view of the segment of chain illustrated in FIGS. 4;

DETAILED DESCRIPTION OF THE DRAWINGS

Figure 1:
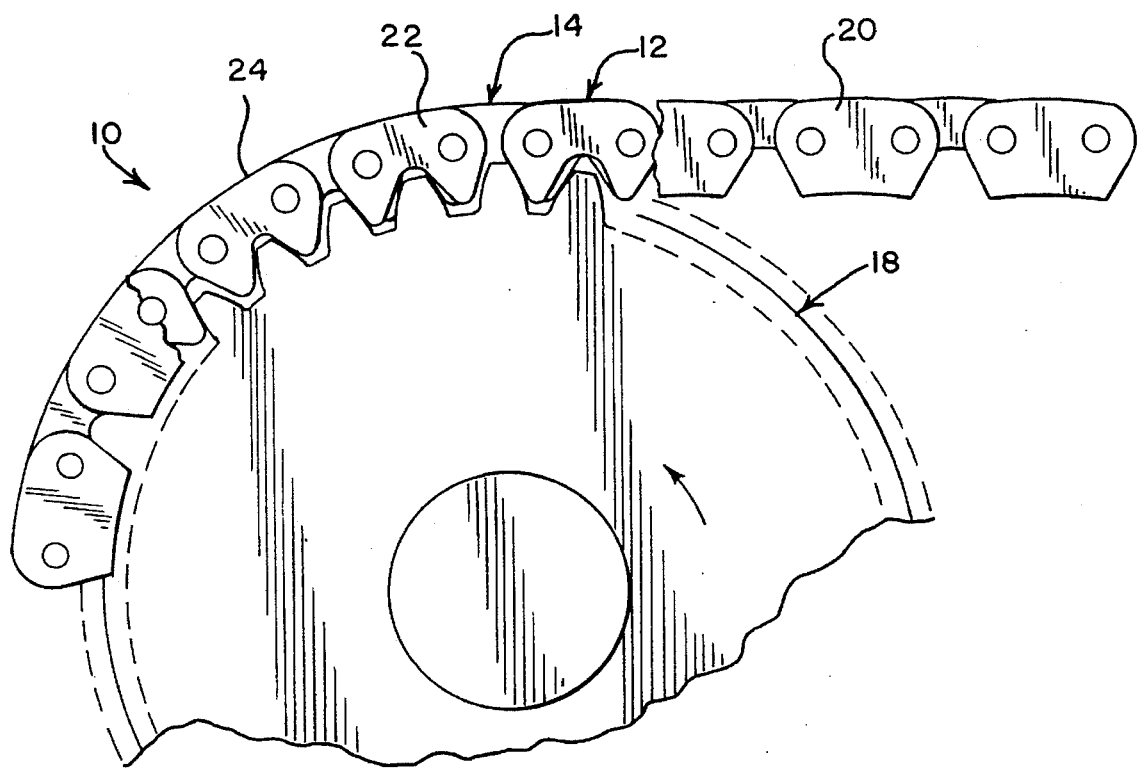
FIG. 1 is a side view of a portion of a sprocket and a segment of a chain constructed with different link forms and different pitch lengths, according to one embodiment of this invention, with portions broken away.

Turning now to the drawings, FIG. 1 illustrates a portion of one embodiment of the chain assembly of the present invention generally at 10. The chain assembly includes sets 12, 14 or ranks of links. The links are shown more clearly in FIGS. 2 and 3. A single set of links extends across the width of the chain and includes several interleaved links. The sets are then interleaved with adjacent sets to form the endless chain assembly.

The chain assembly is utilized to drive, for example, an engine timing assembly, including a camshaft (not shown) and crankshaft (not shown). The shafts contain sprockets, such as the sprocket 18 shown in FIG. 1. The sprockets provide the means of power transfer between the chain and the two shafts.

Some sets of links include guide links 20 along their outside edge. The guide links 20 are included in every other set of links and act to maintain the chain assembly on the sprockets. The guide links do not include any depending members or teeth for providing power transfer to the sprockets. An inside guide link (not shown) may also be used, in which case a groove is provided in the sprocket to maintain the position of the guide link.

Figure 2:
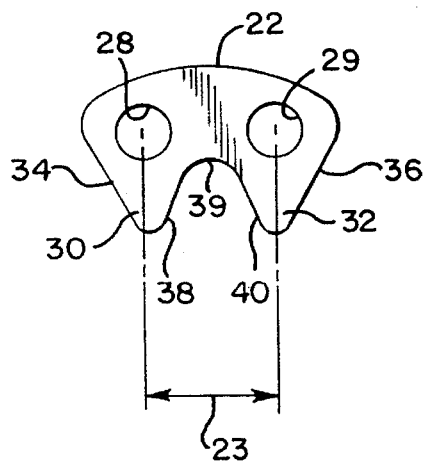
FIGS. 2 and 3 are plan views of two link forms used in the chain segment of FIG. 1, constructed according to one embodiment of this invention.
Figure 3:
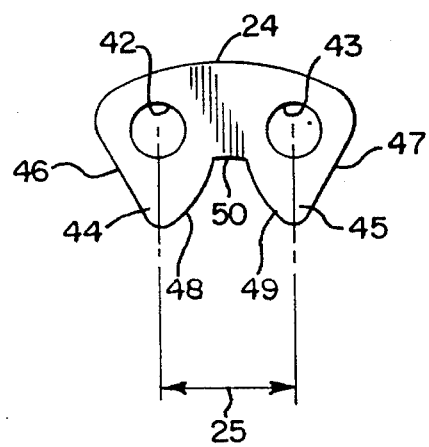
Figure 7:
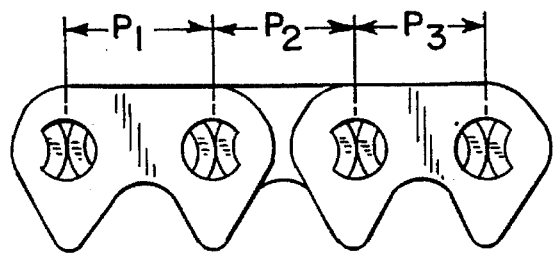
FIGS. 7–9 are side views of segments of different embodiments of the present invention, illustrating links with rocker joints having various rocker shapes.
Figure 8:
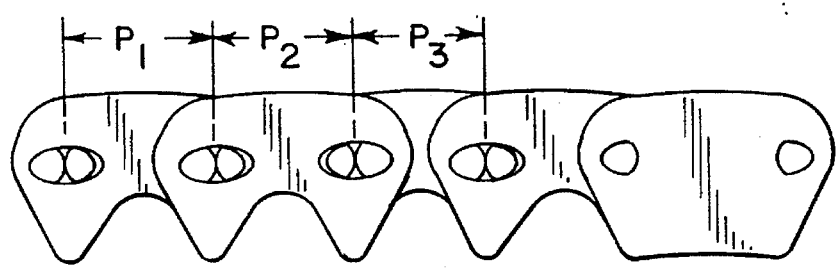
Figure 9:
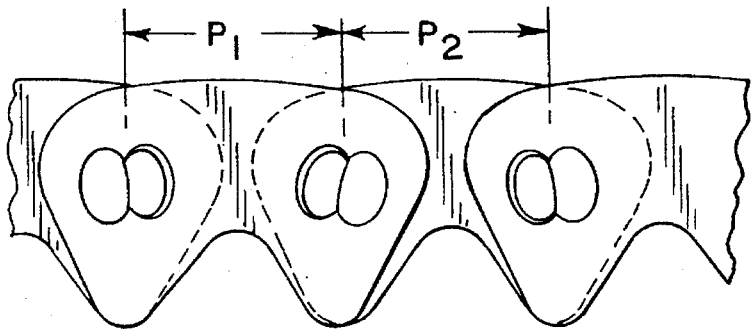

The sets 12, 14 of links also include interleaved inside links 22, 24, or articulating links. The articulating links are provided in a number of forms or configurations, as shown in FIGS. 2 and 3. The links 22, shown in FIG. 2, have a pitch length measured by distance 23. The pitch length of link 22 is the distance between the centers of the circular apertures. The links 22 have a pair of apertures 28, 29 and a pair of depending toes 30, 32. The toes are defined by outside flanks 34, 36 and inside flanks 38, 40. The inside flanks are separated by crotch 39. The flanks of link 22 can have a number of configurations, with the inside and outside flanks being straight or curved. The link can be symmetrical about a vertical centerline between the apertures 28, 29 or can be asymmetrical about the centerline. The apertures are shown for round pins 41, but can include apertures shaped for the pin and rocker of a rocker joint, as shown in FIGS. 7, 8 and 9.

The links 24, shown in FIG. 3, have a pitch length measured by distance 25, which differs from pitch length 23. The links 24 have a pair of apertures 42, 43 and a pair of depending toes 44, 45. The toes are defined by outside flanks 46, 47 and inside flanks 48, 49, separated by crotch 50. The flanks of link 24 can have a number of configurations, with the inside and outside flanks being straight or curved. The link can be symmetrical about a vertical centerline between the apertures 42, 43 or can be asymmetrical about the centerline. The apertures are shown for round pins, but can include apertures shaped for the pin and rocker of a rocker joint.

The sets of interleaved links 22, 24, are shown in FIGS. 4 and 5. The chain may include mixtures of sets having links 22 and sets having links 24, wherein links 22 and 24 have pitch lengths 23 and 25, respectively. Alternatively, links 22 may have pitch length 25 and links 24 may have pitch length 23. In other words, the different configurations of links are matched with different pitch lengths. The difference in pitch length between length 23 and 25 is on the order of 1%–3%, and preferably is on the order of 1%. Many other combinations of links are also possible that are within the scope of the present invention.

All of the links in a single set of links preferably have a matched pitch length and substantially the same outside form. In such a set, the guide links would also have the same pitch length, or a pitch length on the same order as the inside links, but allow for a press fit on the pins. The pitch lengths may be randomized in a chain in which all of the links have the same configuration and orientation. Generally, the pitch lengths of the links in a single set are the same, with the locations of the sets of differing pitch lengths alternated or randomized.

In addition to the randomization of pitch lengths, the configurations of the links may be randomized through the chain. Thus, links of a first configuration may be randomized with links of a second configuration. Preferably, all of the links in a single set of links have a single configuration, with the locations of sets of differing configurations alternated or randomized in a predetermined pattern of randomization. That is, the sets are randomized by placing them in a predetermined random pattern through the chain.

In the preferred embodiment of this invention, the differing pitch lengths and differing configurations are both randomized in the chain assembly. Thus, the first link type, which has a first configuration and a first pitch length is randomized with the second link type, which has a different configuration and a different pitch length. The sets of links are formed of links all of the same type, with the link type sets randomized in a prescribed pattern throughout the length of the chain.

FIGS. 4 and 5 illustrate the randomization of sets of differing link types through the chain assembly. The sets of the first link type are randomly arranged in a prescribed pattern with the sets of the second link type. Additional combinations of links and link sets which further randomize the link types are also possible. For example, links of the first configuration which have the second pitch length, as well as links of the second configuration which have the first pitch length could also be included in the chain assembly. Additional pitch lengths and configurations may also be included and are considered within the scope of the invention.

Many different randomization patterns may also be constructed, provided the links in a single set have a matched pitch length. For example, alternate sets of differing links; random mixtures of various proportions of differing sets of links; random patterns of differing sets of links; or thoroughly random sets of links through the entire chain. Randomization may be used in all or portions of the chain assembly. Additionally, random or hybrid sprockets, single pin rocker joints and phased chain assemblies may be used with this invention.

Figure 6:
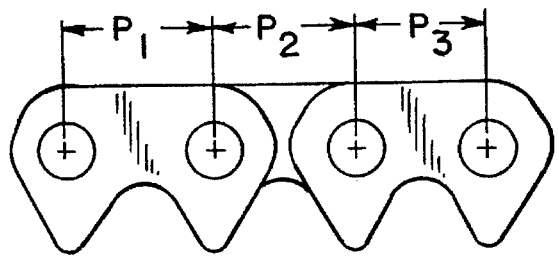
FIG. 6 is a side view of a segment of a chain constructed according to one embodiment of this invention, illustrating links with round pins.

FIGS. 6, 7, 8 and 9 illustrate alternate embodiments of the links of the present invention. FIG. 6 illustrates round pins while FIGS. 7–9 illustrate pins and rockers of a rocker joint. An example of a rocker joint is shown in U.S. Pat. No. 4,507,106, which is incorporated herein by reference. FIGS. 7 and 8 illustrate pins having substantially identical cross-sectional shapes with front convex working surfaces engaging and rocking on one another. FIG. 9 illustrates generally oval pins in apertures having an hour-glass shape with enlarged rounded ends joined by an intermediate neck portion. The shapes of the pins and apertures of FIGS. 6–9 are generally known in the prior art. However, the present invention utilizes these conventional pins and apertures in a chain with links of variant pitch lengths. The pitch lengths of the links of FIGS. 7–9 can be defined as the distances between the contact points of the pins when the chain is in the tight strand or straight-pulled position. Alternative definitions of pitch length may be used with the understanding that the invention relates to combining links of different pitch lengths in a single chain assembly.

The differing pitch lengths of the links in FIGS. 6–9 are shown by the designations $P_1$, $P_2$ and $P_3$. The pitch lengths are varied in accordance with the teachings of the present invention, but $P_1$ may equal $P_3$, which provides only two different pitch lengths in the chain. As taught in the present invention, the configurations of the links may also be varied and randomized.

The use of the chain of the present invention is expected to alter the pattern of contacts of the links with the sprocket teeth during the operation of the chain. The randomization of the configurations of the links and the pitch lengths of the chain will alter or modify the pattern of contacts of the chain links with the sprockets. The exact contacts will be dependent on the configurations and pitch lengths of the links and the arrangement of the links in the chain assembly. Additionally, the chordal action of the sprockets will be altered on account of the modification of the chain mesh with the sprocket. Modification of the chain in the described manner will result in a modification of the pattern of contacts which will modify the noise spectrum for the chain.

Use of a chain assembly or a sprocket constructed in accordance with the teachings of this invention is expected to result in the generation of a noise pattern that is modified in comparison with the noise pattern generated by a chain and sprocket in which all of the inverted tooth links are of identical configuration and orientation, and have the identical pitch length. The chain assembly of this invention is suitable for use with a variety of sprocket tooth forms. Of course, some patterns of combinations of links will provide less objectionable noise characteristics than other patterns of links.

Utilization of the present invention also may allow for design of a chain to fit or match a particular sprocket-to-sprocket center distance. The use of links of different pitch lengths allows for greater variation in the center distance of the chain, in contrast to chains in which all links are formed of identical pitch length. Such a chain has application of the present invention outside of the use of variable pitch for noise reduction.

While several embodiments for the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A power transmission chain comprised of a plurality of interleaved sets of links, pivot members connecting adjacent sets of links, the links of said chain each having a pair of toes separated by a crotch, each toe being defined by an outside flank and an inside flank, the inside flanks of each link being joined at the crotch, each link defining a pair of apertures for receiving said pivot members, some of the links having a first pitch length, and other links having a second pitch length.

2. The power transmission chain of claim 1 wherein some of the links have the centers of said apertures being separated by a first distance, and other links have the centers of said apertures being separated by a second distance.

3. The power transmission chain of claim 2 wherein some sets of links are comprised entirely of links with said aperture centers being separated by said first distance, and other sets of links are comprised entirely of links with said aperture centers being separated by said second distance.

4. The power transmission chain of claim 3 wherein said some sets of links and said other sets of links are randomly arranged.

5. The power transmission chain of claim 3 wherein said some sets of links and said other sets of links are arranged in a prescribed pattern.

6. The power transmission chain of claim 1 wherein some of said links have a leading flank of a first configuration, others of said links have a leading flank of a different configuration.

7. The power transmission chain of claim 6 wherein some of said links comprise links having inside flanks of a first configuration, others of said links comprise links having inside flanks of a different configuration.

8. The power transmission chain of claim 6 wherein some of said links comprise links having outside flanks of a first configuration, others of said links comprise links having outside flanks of a different configuration.

9. The power transmission chain of claim 6 wherein said first configuration is an arcuate configuration.

10. A power transmission chain comprised of a plurality of interleaved sets of links, pivot members connecting adjacent sets of links, the links of said chain each having a pair of toes separated by a crotch, each toe being defined by an outside flank and an inside flank, the inside flanks of each link being joined at the crotch, each link defining a pair of apertures for receiving said pivot members, some sets of links comprising links having a first pitch length and a first link form, and other sets of links comprising links having a second pitch length and a second link form.

11. The power transmission chain of claim 10 wherein said some sets of links and said other sets of links are randomly arranged.

12. The power transmission chain of claim 10 wherein said some sets of links and said other sets of links are arranged in a prescribed pattern.

13. The power transmission chain of claim 10 wherein said some sets of links include links having substantially straight inside and outside flanks.

14. The power transmission chain of claim 10 wherein said some sets of links include links having substantially straight outside flanks and arcuate inside flanks.

15. The power transmission chain of claim 12 wherein said first pitch length exceeds said second pitch length by less than 3%.

16. The power transmission chain of claim 12 wherein said first pitch length exceeds said second pitch length by less than 1%.

17. The power transmission chain of claim 10 wherein said pivot member is a round pin.

18. The power transmission chain of claim 10 wherein said pivot member includes a pair of pins having substantially identical cross-sectional shapes with front convex working surfaces engaging and rocking on one another.

19. The power transmission chain of claim 18 wherein each aperture of said links has a generally hour-glass shape with enlarged rounded ends joined by an intermediate neck portion.

* * * * *